(12) United States Patent
Roberts

(10) Patent No.: US 6,833,917 B1
(45) Date of Patent: Dec. 21, 2004

(54) COMPACT BIREFRINGENT SPECTROMETER WITH ELECTRICALLY ADJUSTABLE PASSBAND

(75) Inventor: Mark W. Roberts, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/653,788

(22) Filed: Sep. 3, 2003

Related U.S. Application Data

(63) Continuation-in-part of application No. 09/891,704, filed on Jun. 26, 2001, now Pat. No. 6,618,142.

(51) Int. Cl.$^7$ ................................................. G01J 3/28
(52) U.S. Cl. ........................ 356/327; 356/326; 356/331; 359/352; 359/495; 359/615
(58) Field of Search ................................ 356/326, 300, 356/327, 331, 332; 359/350, 352, 487, 488, 494, 495, 496, 497, 498, 500, 615, 631, 837; 385/36; 362/19, 26, 31; 349/193, 200

(56) References Cited

U.S. PATENT DOCUMENTS

| | | | | |
|---|---|---|---|---|
| 4,909,626 A | * | 3/1990 | Purvis et al. | ................ 356/332 |
| 5,446,534 A | * | 8/1995 | Goldman | ..................... 356/128 |
| 6,222,627 B1 | * | 4/2001 | Seitz et al. | .................. 356/326 |
| 6,618,142 B1 | * | 9/2003 | Roberts | ...................... 356/327 |

FOREIGN PATENT DOCUMENTS

| | | | | | |
|---|---|---|---|---|---|
| GB | | 2106665 A | * | 4/1983 | ............ G02B/5/30 |

* cited by examiner

Primary Examiner—Thong Nguyen
Assistant Examiner—Arnel C. Lavarias
(74) Attorney, Agent, or Firm—Peter A. Lipovsky; Michael A. Kagan; Celia C. Dunham

(57) ABSTRACT

An electrically adjustable spectrometer uses collimated, P-polarized light made incident on a surface of an optically transparent liquid crystal input material. The material transmits the light to a boundary surface between the input material and an output optically transparent material. The input material is preferably highly dispersive, making Snell component values at the boundary surface markedly different for different wavelengths. The output material is preferably of low dispersion and high birefringence. Only one wavelength at the boundary surface has a Snell component value tangent to its corresponding index surface in the output section. Within this section, the ray vector for this wavelength is parallel to the boundary surface. Because optical energy propagates in the ray vector direction, only the narrow range of wavelengths having ray vectors substantially parallel to the boundary surface reach an output of the device. This range comprises the passband of the spectrometer and is adjustable electrically.

10 Claims, 9 Drawing Sheets

COMPACT BIREFRINGENT SPECTROMETER WITH ELECTRICALLY ADJUSTABLE PASSBAND

CROSS-REFERENCE TO RELATED APPLICATION

This application is a continuation-in-part of U.S. patent application Ser. No. 09/891,704 filed Jun. 26, 2001 incorporated by reference herein, now U.S. Pat. No. 6,618,142.

BACKGROUND OF THE INVENTION

This invention relates generally to spectroscopy and, in particular, to a compact spectrometer capable of a broad spectral range.

As described in the above referenced patent, it is desirable to have a simple, compact spectrometer which has a narrow passband and can be used over a broad spectral range. Prism or grating spectrometers may be used to analyze a wide spectral range but require a large physical size to achieve sufficient separation of spectra. While these types of spectrometers may be made smaller, a loss of spectral resolution will occur. Fabry-Perot spectrometers utilizing etalons are capable of very high resolution with small size, but an individual etalon cannot cover a broad spectral range.

In the above-cited patent, a spectrometer that has small dimensions, a narrow passband, and that can be used over a broad spectral range is disclosed. The desired passband of this spectrometer is adjusted by altering the angle of incident of incoming light to the spectrometer. This can either be performed by rotating the spectrometer while maintaining the direction of incoming light or by maintaining the orientation of the spectrometer and by altering the direction of the incoming light or by a combination of these.

In some applications, it may be considered advantageous to adjust the passband of the above described spectrometer by neither changing the orientation of the spectrometer nor by changing the direction of the measured light. It is therefore considered desirable to have an even greater choice of adjusting the passband of the spectrometer of the above-cited patent.

SUMMARY OF THE INVENTION

As in the previously patented invention, collimated, P-polarized light is made incident on an input surface of an optically transparent material at an angle $\theta_{INC}$. The light is transmitted through this input transparent material, and reaches a boundary surface between the input material and an output optically transparent material. The material of the input section is preferably highly dispersive, making Snell component values (n sin θ) at the boundary surface markedly different for different wavelengths (colors). The material of the output optically transparent material is preferably of low dispersion and high birefringence, such as is characteristic of calcite, for example. The output optically transmissive material is oriented so that its optic axis is other than normal to the boundary surface and is aligned to maximize the birefringence effect of the material.

As in the previous embodiment of the invention described in the above referenced patent, there will be only one wavelength present at the boundary surface that has a Snell component value (n sin θ) that is tangent to its corresponding index surface in the output section of the invention. Within this output section, the ray vector, (r), for this wavelength, is parallel to the boundary surface.

Because optical energy propagates in the direction of the ray vector, only the narrow range of wavelengths having ray vectors that are substantially parallel to the boundary surface are able to reach an output surface at an end of the output section. This narrow range of wavelengths comprises the passband which is incident on the detector.

In the above cited patent, tuning of the spectrometer to permit different colors to reach the detector is accomplished by changing the incident angle, $\theta_{INC}$, of the light reaching the spectrometer. In the example of the invention described in the above-cited patent, a solid material for the input section is a described. In this solid input material embodiment, tuning is accomplished either by changing the direction of the incident light or by rotating the device. A change in $\theta_{INC}$ changes the length (n sin θ) of all of the colors at the boundary surface of the device. This controls the wavelength whose ray vector is parallel to the boundary in the upper section and, thus, selects which wavelengths are included in the spectrometer's passband.

In the invention described herein, the spectrometer of the above referenced patent is modified so that the angle of incidence of light upon a fixed spectrometer need not be altered to change the passband of the spectrometer. Movement of the spectrometer with respect to the incident light is also unnecessary to perform passband adjustment. Passband adjustment is instead permitted by using a voltage tunable liquid crystal material. It is possible however to combine reorientation of the incidence light in conjunction with voltage tuning to extend the spectrometer's passband tuning options.

Other objects, advantages and new features of the invention will become apparent from the following detailed description of the invention when considered in conjunction with the accompanied drawings.

DESCRIPTION

Figure 1:
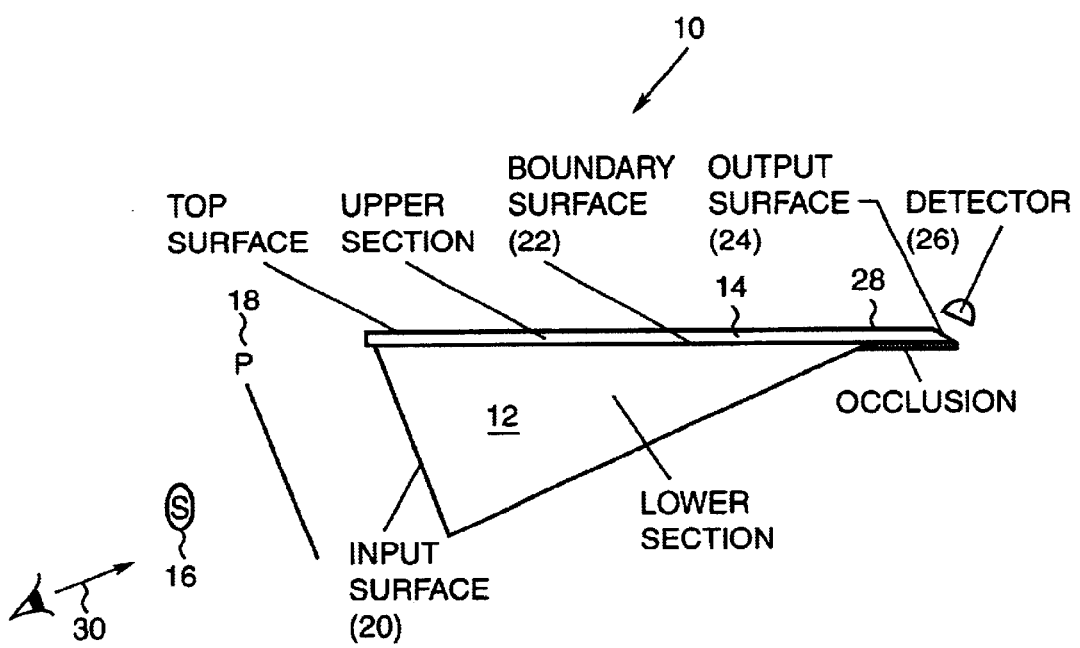
FIG. 1 illustrates a top view of an exemplary embodiment as shown previously in the above-cited patent.

Referring to FIG. 1, spectrometer 10 has two sections 12 and 14 which are held together in good optical contact. Lower (input) section 12 is an optically transparent material that has relatively large dispersion (difference in refractive indices) over the wavelength range being analyzed, resulting in a large difference between radii of index surfaces as a function of wavelength. This section may be made from either an isotropic or a birefringent material. The upper (output) section is a thin, optically transparent material that can be as little as a few wavelengths in thickness (shown in the figure as the distance between top and boundary surfaces). In a preferred embodiment, this material is strongly birefringent—it has a large difference between its ordinary and extraordinary refractive indices at any given wavelength—but has very little dispersion as a function of wavelength. The length of the device can be as small as several tenths of a millimeter with millimeter and centimeter sizes being typical. The height and length of both the input and output sections of the invention are a function of desired light collection, a determination of which can be made by one of ordinary skill in the art.

Figure 2:
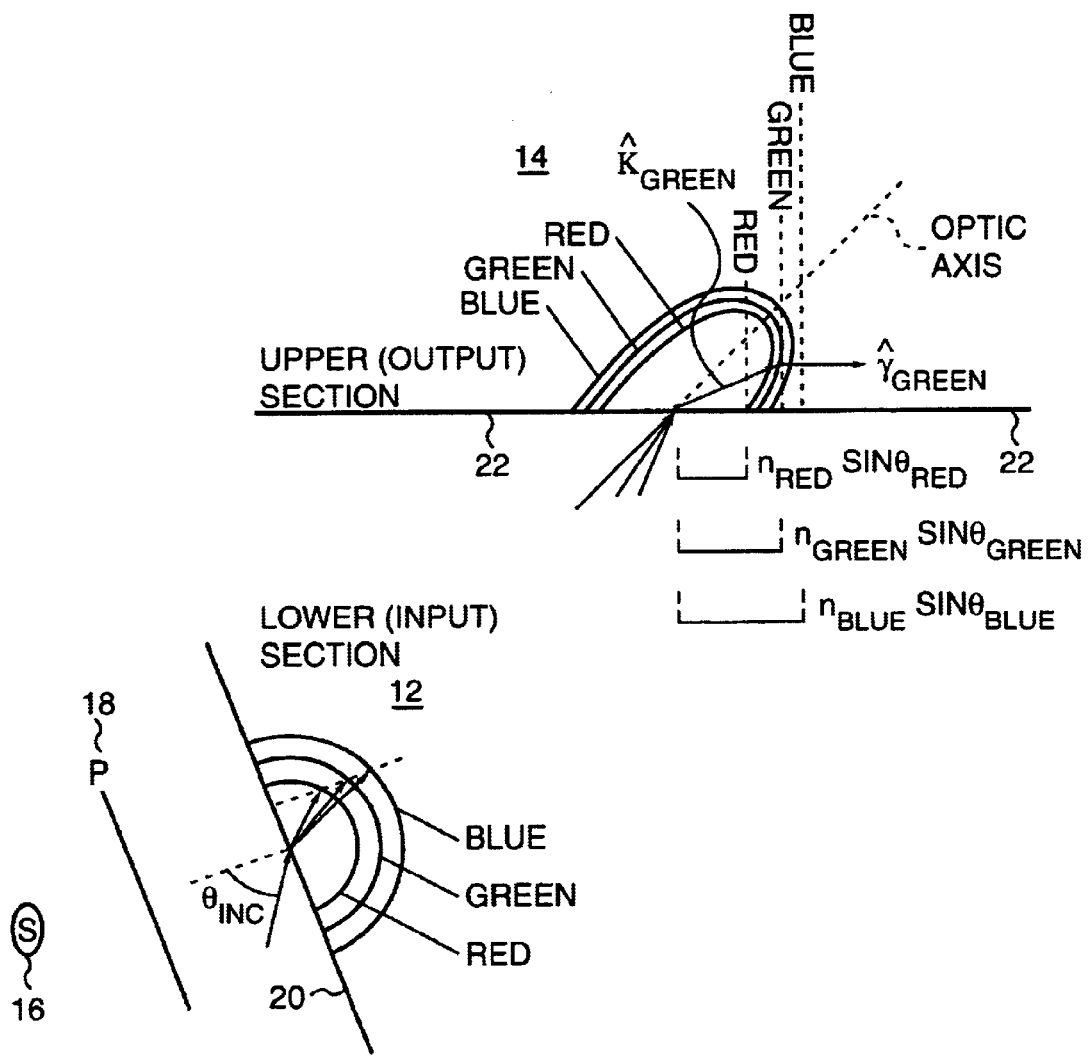
FIG. 2 describes the optical mechanism of the spectrometer of FIG. 1 as shown previously in the above-cited patent.

The operation of the spectrometer is described with reference to FIG. 2, wherein the plane of light utilized coincides, for explanation purposes, with the plane of the paper upon which this figure is illustrated. In this figure, the index surfaces for red, green, and blue light are shown. In a preferred embodiment, the lower section is isotropic and the upper section is uniaxial, however the lower section may also be birefringent and the upper section biaxial. The characteristic of the lower section as used in the invention is light dispersiveness. In the upper section, birefringence is optimized as shown whether uniaxial or biaxial materials are used. In FIG. 2, normal chromatic order is shown: the index surface for blue light is larger than that for green, which is larger than the index surface for red light.

Collimated light from source 16 is polarized through P-polarizer 18 so that P-polarized light is incident on an input surface 20 of input section 12 at angle $\theta_{INC}$. The light is transmitted through lower input section 12 and reaches boundary surface 22 between the two sections. Since the material of the lower section is highly dispersive, the Snell component values (n sin θ) of the incoming light present at boundary surface 22 are markedly different for the different wavelengths (colors) of light. Only one wavelength has a value of (n sin θ) which is tangent to its corresponding index surface in upper output section 14, the optic axis of this section being other than normal to surface 22. In FIG. 2, this is shown for green light. Within upper output section 14, the ray vector, r, for this wavelength is parallel to boundary surface 22.

Because optical energy propagates in the direction of the ray vector, only a narrow range of wavelengths which have ray vectors that are substantially parallel to the boundary surface are able to reach the output surface at the right side of the upper section. This narrow range of wavelengths comprises the passband which reaches the detector.

Referring again to FIG. 1, upper output section 14 has an output surface 24 that is beveled so that its angle with respect to the propagation vector, k, of the light in the passband is approximately equal to Brewster's angle. This allows for maximum transmission of the energy in the passband through the output surface to an associated detector 26 which in a preferred embodiment is fastened to the spectrometer. Alternatively, the entrance aperture of a fiber optic may be used in place of the detector shown. The fiber optic is then used to transmit the light from the output surface to a detector which may be some distance from the spectrometer.

A small length 28 of upper section 14 extends beyond the edge of lower section 12 terminating in output surface 24 of the device. The extension functions to substantially prevent light from the lower section from directly reaching the output surface. Lengthening this extension will cause a narrowing of the passband width of the spectrometer. The light input side of the extension is purposely occluded to prevent stray light from reaching the output surface. The occlusion is thick enough to provide mechanical support for the thin extension and can be a sub-micron sized metal layer or an opaque plastic layer, for example.

For a particular $\theta_{INC}$, wavelengths that are outside of the passband cannot reach the output surface. Shorter wavelengths cannot obey Snell's Law ($n_1 \sin \theta_1 = n_2 \sin \theta_2$) at the boundary surface (22) and are totally reflected (k vector total internal reflection). In FIG. 2, this is true for the blue light.

Longer wavelengths are able to enter the upper section, but cannot reach the output surface. The ray vectors of these colors cause their energy to be transmitted through the upper section and out the top surface of this section. Some of the longer wavelengths have a second ray vector in the upper section which causes part of their energy to be propagated back into the lower section (r vector total internal reflection). In either case, none of this light reaches the output surface or the detector. This is the case for the red light in FIG. 2.

In an embodiment of the invention described in the above-referenced patent, the spectrometer is tuned to permit different colors to reach the detector by changing the incident angle, $\theta_{INC}$. This tuning is accomplished either by changing the direction of the incident light or by rotating the device or by a combination of these approaches. A change in θ, changes the length (n sin θ) of all of the colors at the boundary surface. This controls the wavelength whose ray vector is parallel to the boundary in the upper section and, thus, selects which wavelengths are included in the spectrometer's passband.

In accordance with the modified spectrometer embodiment newly described herein, liquid crystals are used as the spectrometer's input optically transparent element. The optical properties of the liquid crystal can be electrically adjusted so that the passband of the spectrometer is correspondingly adjusted. By using this technique, passband adjustment requiring alteration of the angle of incoming light with respect to the spectrometer can be avoided.

Figure 4:
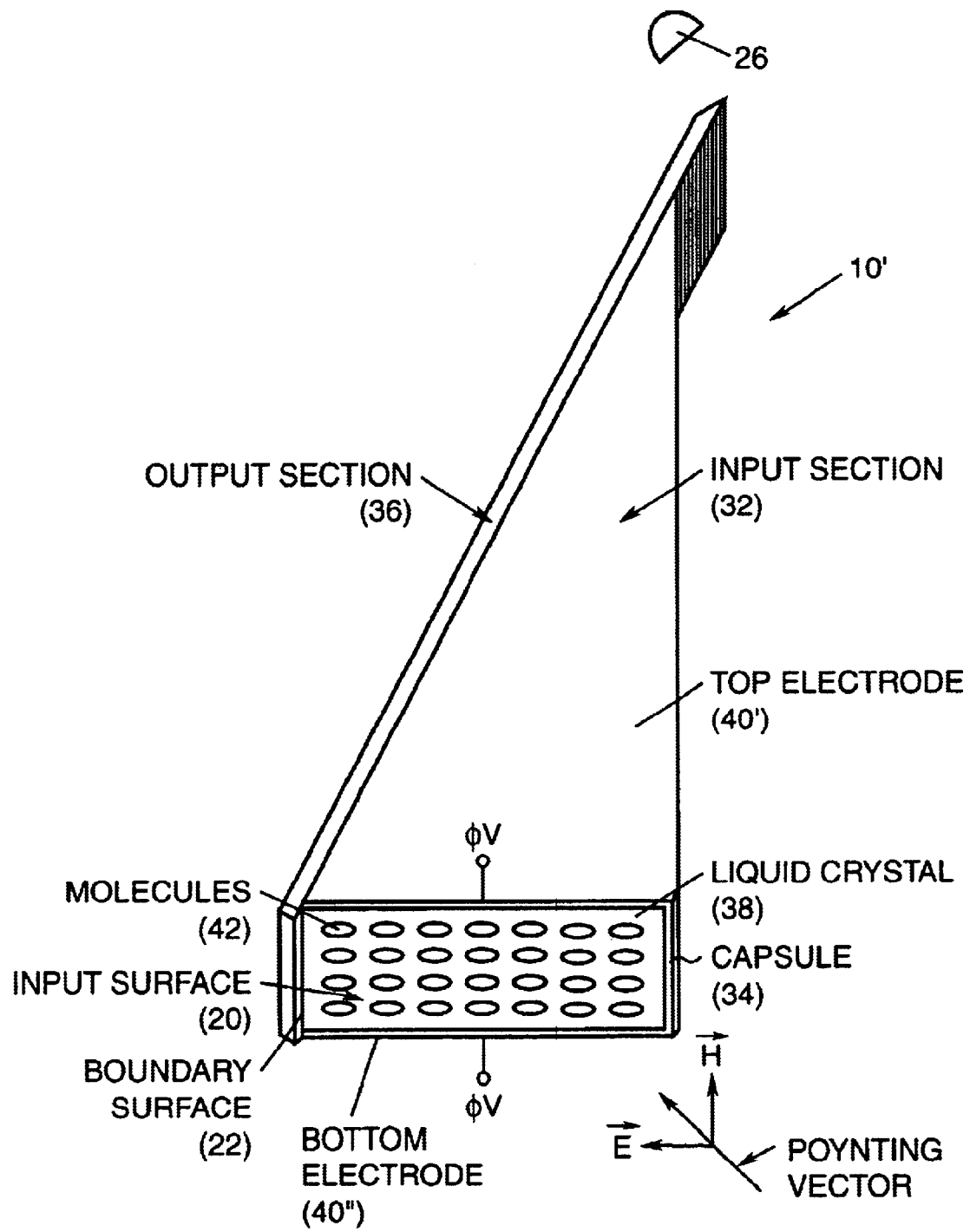
FIG. 4 illustrates a side perspective view of an electrically adjustable passband spectrometer according to a new embodiment provided herein.

Referring now to FIG. 4, a side perspective view as taken from the direction 30 shown in FIG. 1 is presented. In this newly described embodiment of the invention, an input element section 32 includes an open-ended capsule 34. Capsule 34 has an open end that interfaces at boundary surface 22, lying between input element section 32 and output element section 36 of spectrometer 10'. Capsule 34 includes an optically transparent window that coincides with input surface 20 of spectrometer 10'. For simplicity of illustration, this window is not shown.

Input element section 32 is attached to output element section 36 in any way found suitable to one skilled in the art, for example by glueing the input element section to the output element section at the open edges of the capsule 34. Capsule 34 is filled with suitable liquid crystals 38 as available in the art. Liquid crystals 38 will interface most of the boundary surface between input element section (32) and output element section 36 (except where the capsule 34 is fastened to the output element section of the device). Electrodes 40' and 40" are attached to opposite surfaces of input element section 32. These electrodes, such as of copper or aluminum, can be applied by vacuum deposition for example.

As shown in FIG. 4, an extraordinary refractive index state of the liquid crystal is shown. With no voltage applied between electrodes 40' and 40", the mechanical interaction between liquid crystal molecules 42 and the walls of the capsule causes the molecules to be aligned with their long axes normal to boundary surface 22. (The long axis of the liquid crystal molecules being horizontal in this figure.) The long axis of each molecule 42 specifies the extraordinary optical axis of the molecule. P-polarized light (electric field of which is horizontal in the figure shown) is incident on input surface 20 and would thus be subject to the extraordinary refractive index of the liquid crystal material.

Figure 5:
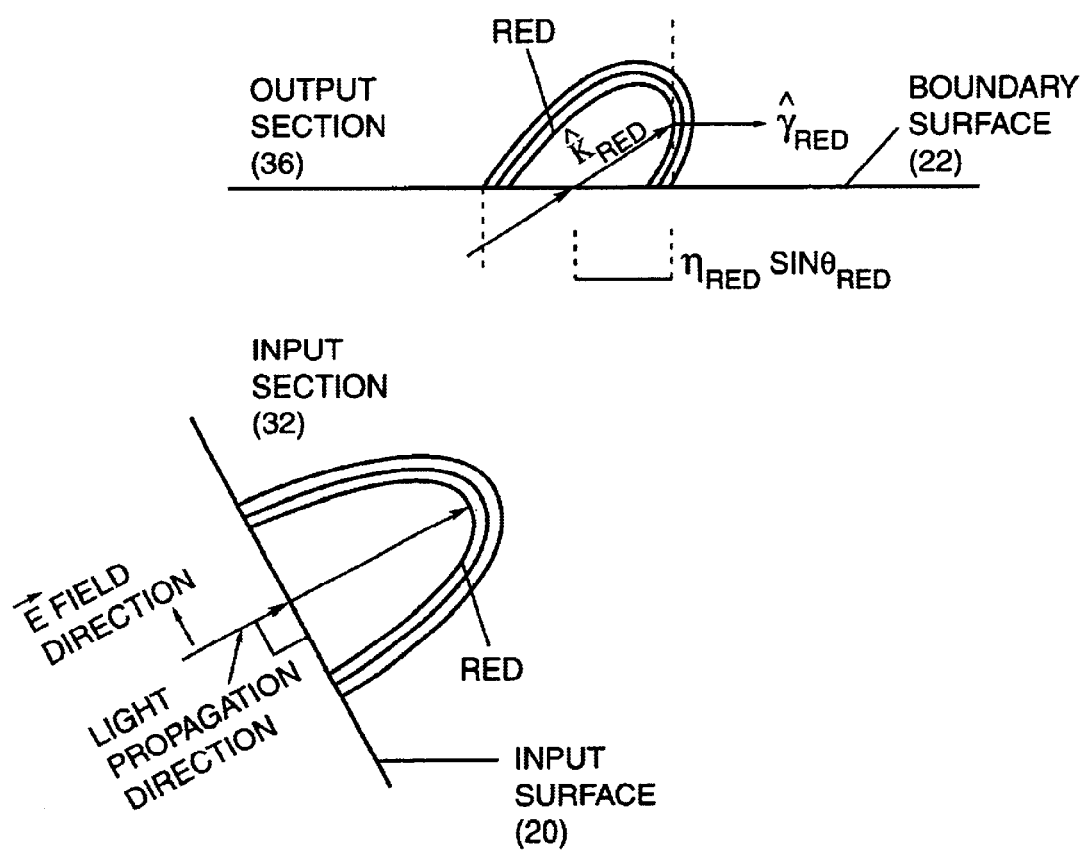
FIG. 5 describes the optical mechanism of the spectrometer of FIG. 4.

In FIG. 5 (not drawn to scale), it is assumed that the extraordinary index of refraction of the liquid crystal material is larger than its ordinary refractive index. The opposite of this could also be true, and the new embodiment described will still function correctly. It is also assumed in this figure that the light is incident normal to the input surface of the device. This need not be the case.

The index surfaces shown in the new input element section of FIG. 4 are drawn assuming that there is no voltage difference between the electrodes fastened to the opposing surfaces of input element section 32. For this case, the Snell component of the red light has the proper length at boundary surface 22 (between input element section 32 and output element section 36), so that the red light is propagated nearly parallel to the surface in the output element section. Thus, the red light will reach the detector through the output surface.

Figure 6:
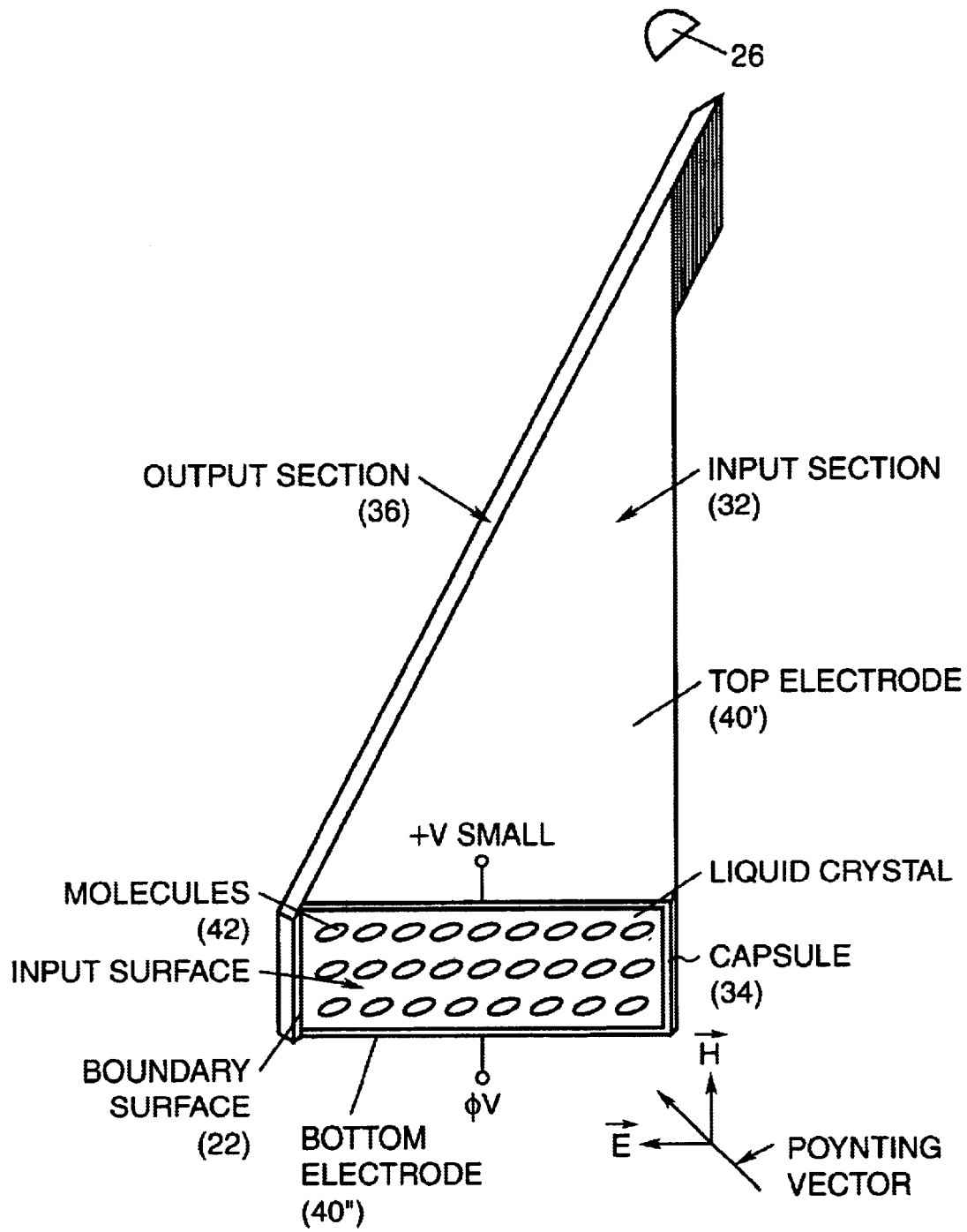
FIG. 6 illustrates a side perspective view of the electrically adjustable passband spectrometer of FIG. 4 undergoing a small electrical adjustment.

As shown in FIG. 6, when a fixed voltage difference is applied between electrodes 40' and 40" on the opposing surfaces of input element section 32, the long axis of liquid crystal molecules 42 partially rotate and begin to align their long axes more in the direction of the voltage difference. This rotation is opposed by the mechanical interaction of the molecules with the inner walls of capsule 34. For a particular, fixed, voltage difference between the electrodes, alignment of the long axes of the liquid crystal molecules finds a new stable direction somewhere between being normal and parallel to the boundary surface.

Figure 7:
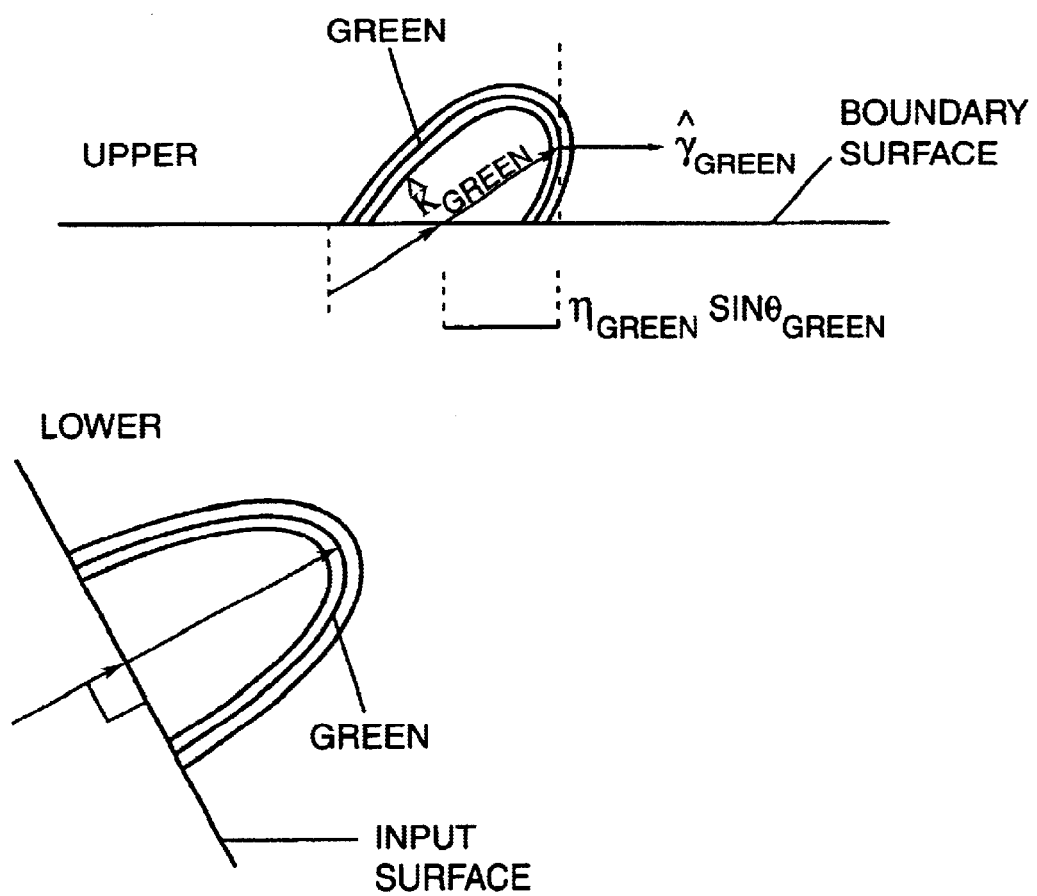
FIG. 7 describes the optical mechanism of the spectrometer of FIG. 6.

FIG. 7 describes the optical mechanism of the spectrometer of FIG. 6 illustrating the case of a particular, fixed, voltage difference between the opposing electrodes. Since alignment of the long axes of the liquid crystal molecules are no longer normal to the boundary surface, the refractive index experienced by the P-polarized light passing through the input element section decreases. This in turn decreases the length of the Snell components along the boundary surface between the input element section and the output element section. For the case shown in FIG. 7, the voltage difference has the appropriate value to cause the green light to reach the detector through the output surface of the output element section.

Figure 8:
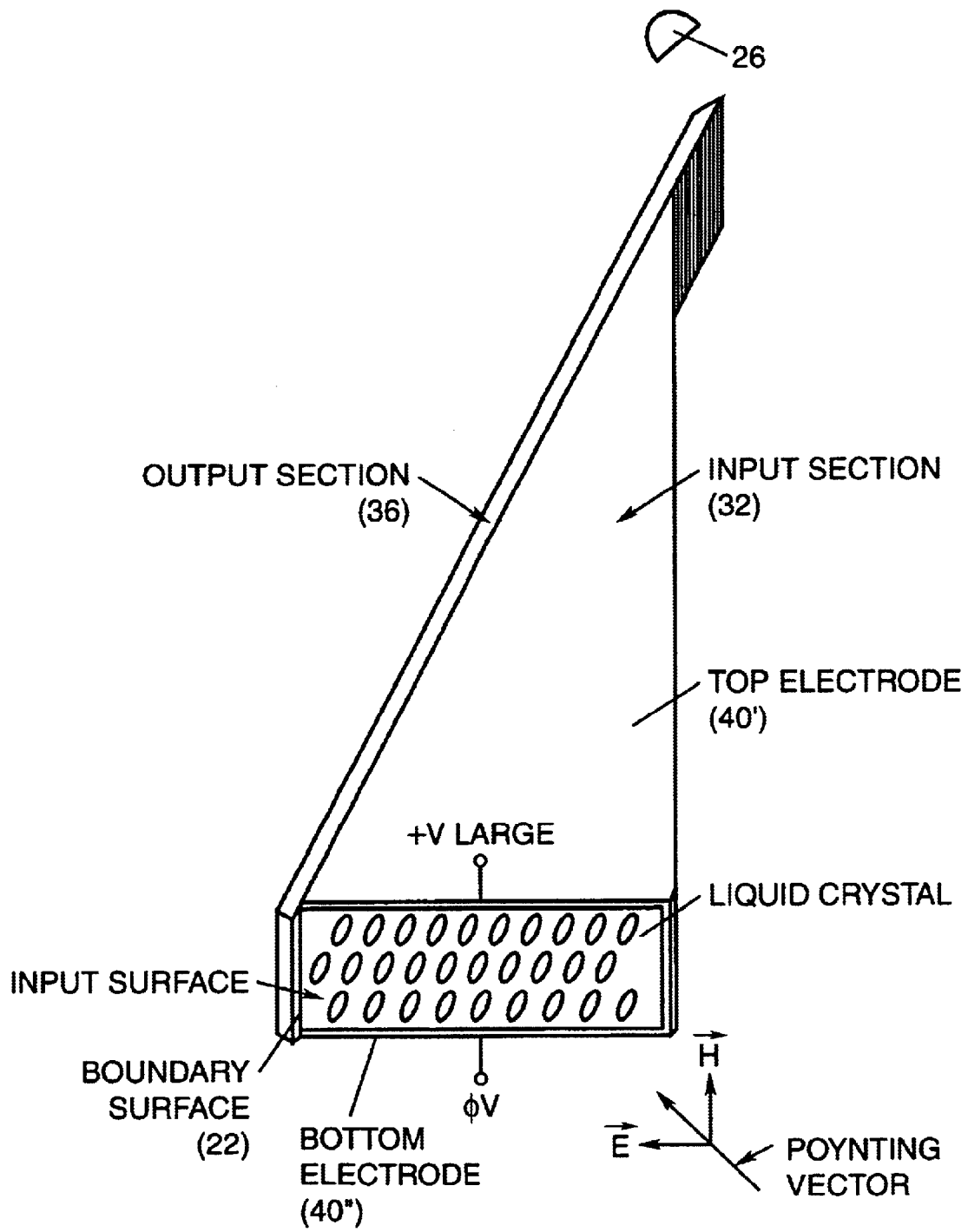
FIG. 8 illustrates a side perspective view of the electrically adjustable passband spectrometer of FIG. 4 undergoing a large electrical adjustment.
Figure 9:
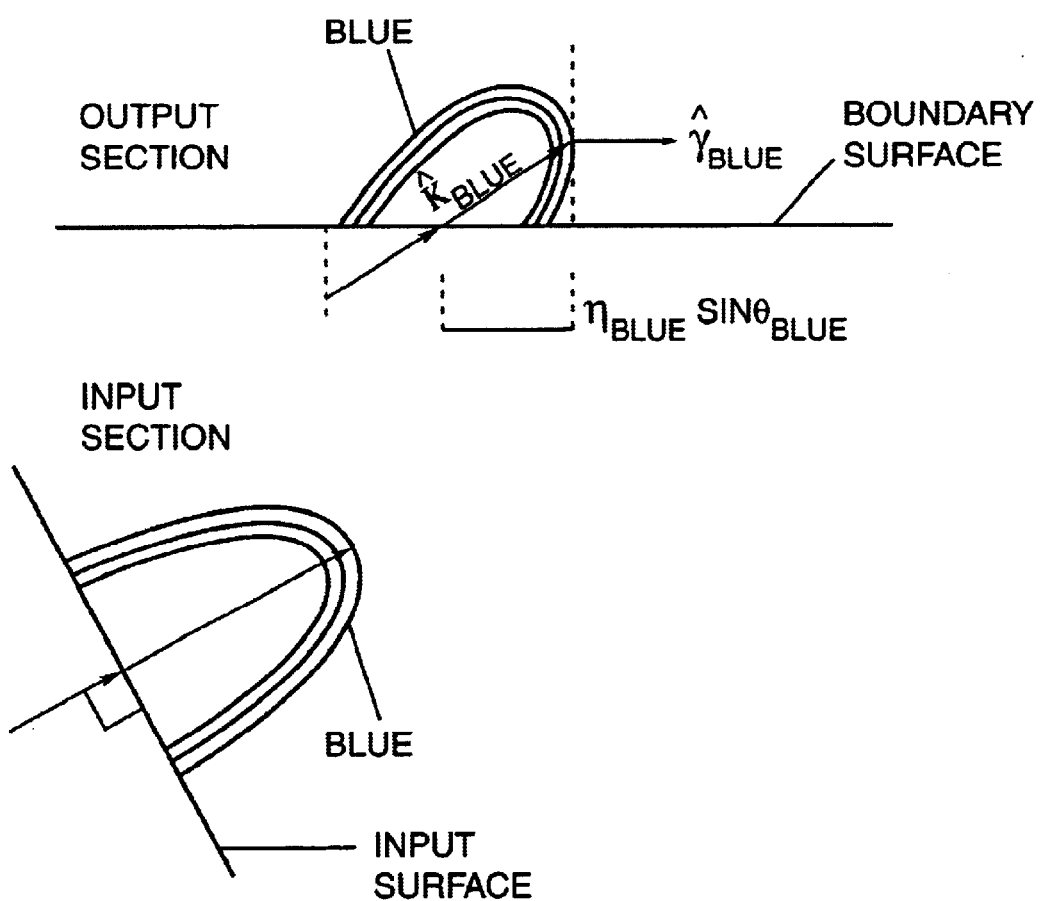
FIG. 9 describes the optical mechanism of the passband adjusted spectrometer of FIG. 8.

As shown in FIG. 8, a larger voltage difference is applied between the electrodes. The stable orientation for the long axes of the liquid crystal molecules is now rotated even more. Consequently, the incident P-polarized light is subject to a refractive index that is closer to the (smaller) ordinary refractive index of the liquid crystal material. The lengths of the Snell components at the boundary surface again decrease. For this case, as shown in FIG. 9, the Snell component length of the blue light has the appropriate length to allow the blue light to reach the detector after passing through the output element section and the output surface.

The wavelength "tuning" of the spectrometer embodiment newly described here is accomplished without changing the angle of incidence of the light on the input surface of the spectrometer. By using this new alternate design for the spectrometer, the wavelengths of light that are allowed to reach the detector may be selected by changing the voltage difference between the electrodes fastened to the opposing surfaces of the new input element section. This allows "voltage tuning" of the device, as opposed to the previous "angle tuning" of the device (changing the angle of incidence of the light on the input surface). The limits for the "voltage tuning" are: no voltage difference between the electrodes—the long axes of the liquid crystal molecules are all substantially normal to the boundary surface, and the light experiences the extraordinary refractive index state of the liquid crystal material; maximum voltage difference between the electrodes—the long axes of the liquid crystal molecules are all substantially parallel to the boundary surface, and the light experiences the ordinary refractive index state of the liquid crystal material. It should be noted that "voltage tuning" and "angle tuning" may be used together. By combing the two tuning techniques, the wavelength analysis range of the spectrometer could be extended.

The advantages of the newly described invention are numerous.

a. The device can be miniaturized without compromising its performance. The two sections of the device need to be only a few wavelengths thick to effectively direct the energy within the passband to the detector.

b. A large percentage of the incident light within the passband will reach the detector. Light incident on the entire boundary surface is concentrated onto the detector by using the ray vector that is parallel to the surface.

The materials used in the spectrometer are selected and cut to minimize the difference between the k vector directions for the passband wavelengths in the two sections. This minimizes the reflection loss at the boundary surface and maximizes transmission into the upper section of the device.

c. With proper choice of materials for the upper and lower sections, the spectrometer may be used in the ultraviolet, visible, and infrared regions of the electromagnetic spectrum.

d. The birefringent spectrometer is easy to operate. The wavelengths in the passband are selected by adjusting the voltage across the liquid crystal input section which may also be enhanced by simultaneously changing the angle of incidence of the light on the input surface of the device.

As will be apparent to one of ordinary skill in the art in light of the description given here, a variety of alternatives of the invention are possible.

The material of the input optically transparent element for use in visible light may be chosen from the group of sphene and flint glass.

Some of the materials that may be used in the upper light output section for operation from the near ultraviolet, thought the visible, into the near infrared are calcite, $LiNbO_3$ (Lithium Niobate) and $LiIO_3$. Selenium or $TiO_2$ may be used for operation in the infrared.

The material of the upper section shown in FIG. 2 was assumed to have a uniaxial optical indicatrix and strong birefringence but only minor dispersion of the indicatrices—as is true, for example, in a crystal of calcite.

Figure 3:
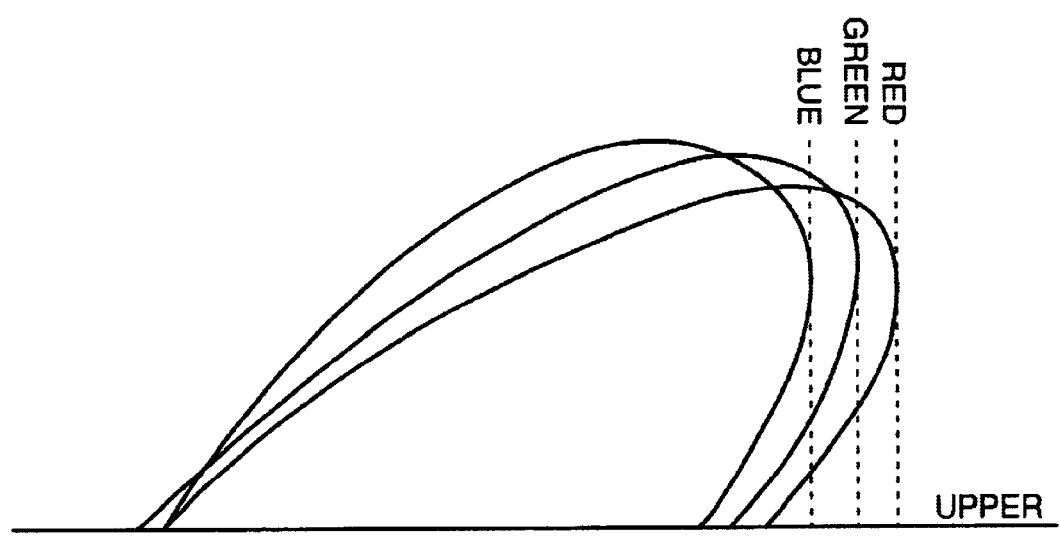
FIG. 3 illustrates an alternative embodiment of the spectrometer of FIG. 1 as shown previously in the above-cited patent.

Many biaxial birefringent materials exhibit "dispersion of the bisectrices" meaning that the different color index surfaces are not aligned. Monoclinic crystals that have "inclined dispersion" are one example of this. If the dispersion of the bisectrices is sufficiently larger than the dispersion of the indicatrices in a crystal, this type material could be used as the upper section and would have a chromatic order as shown in FIG. 3, which is the reverse of that shown in FIG. 2. This would give the spectrometer an ultra-narrow passband.

One skilled in the art will realize with the benefit of this description that the invention could also be implemented in the microwave and radio wave regions with appropriate modifications, however such modifications will of course require an enlargement of the device.

Obviously, many modifications and variations of the invention are possible in light of the above description. It is therefore to be understood that within the scope of the claims, the invention may be practiced otherwise than as has been specifically described.

What is claimed is:

1. A spectrometer for discerning components of collimated light comprising:

a P-polarizer for P-polarizing said collimated light;

a open-ended hollow capsule having an optically transparent window for receiving said P-polarized light;

liquid crystals, said hollow capsule being substantially filled with said liquid crystals for transmitting said P-polarized light as received at said optically transparent window to a boundary surface at said open-ended end of said capsule, said liquid crystals being of a material that is of relatively high light dispersiveness that separates said P-polarized light into wavelength dependent (k-vector) directions representative of different colors wherein said liquid crystals are aligned with respect to said boundary surface to maximize the dispersive effect of said liquid crystals so that Snell component values at said boundary surface are made markedly different for different wavelengths of said P-polarized light, said liquid crystals having a characteristic of varying between an extraordinary refractive index state in which liquid crystal molecules of said liquid crystals have long axes that are substantially normal to said boundary surface and wherein said P-polarized light experiences an extraordinary refractive index of said liquid crystals, and an ordinary refractive index state in which liquid crystal molecules of said liquid crystals have long axes that are substantially parallel to said boundary surface and wherein said P-polarized light experiences an ordinary refractive index of said liquid crystals, said liquid crystals being sandwiched between opposing electrodes wherein said liquid crystals are variable between said extraordinary state and said ordinary state by varying a voltage difference between said opposing electrodes; and an output optically transparent element for receiving said P-polarized light as transmitted through said liquid crystals and presented at said boundary surface and having an output surface for emitting light within a desired passband when present, said output element being of a highly birefringent, relatively low light dispersiveness material having an optic axis other than normal to said boundary surface and aligned to maximize the birefringence affect of said material, said material being characterized by having a plurality of index surfaces corresponding to different colors so that a Snell's component received from said liquid crystals within said passband aligns tangentially with one of said index surfaces to propagate light within said desired passband through said outer surface in the direction of a ray vector that is substantially parallel to said boundary surface.

2. The spectrometer of claim 1 wherein frequencies within said passband of said spectrometer are selected by adjusting said voltage difference between said opposing electrodes.

3. The spectrometer of claim 1 wherein said output element has an extension that extends past said input element to terminate with said output surface.

4. The spectrometer of claim 3 wherein the length of said extension is selected to adjust the width of said passband.

5. The spectrometer of claim 1 wherein said output surface is beveled to maximize transmission of light in said passband through said output surface.

6. The spectrometer of claim 1 further including a detector for detecting the presence and intensity of light emitted at said output surface.

7. The spectrometer of claim 1 wherein said output optically transparent element is used for ultraviolet through visible light and wherein said output element is of a material chosen from the group of calcite, $LiNbO_3$, and $LiIO_3$.

8. The spectrometer of claim 1 wherein said output optically transparent element is used for infrared light and wherein said output element is of a material chosen from the group of Selenium and $TiO_2$.

9. The spectrometer of claim 1 wherein said input optically transparent element is used for visible light and wherein said element is of a material chosen from the group of sphene and flint glass.

10. The spectrometer of claim 1 wherein said output optically transparent element is chosen of a material exhibiting dispersion of the bisectrices.

* * * * *